May 27, 1941.　　　　C. C. KINKER　　　　2,243,756
ACTUATING MECHANISM FOR CUTOFF KNIVES
Original Filed July 1, 1938　　　4 Sheets-Sheet 2

C. C. Kinker
INVENTOR.

BY Rule & Hoge
ATTORNEYS.

May 27, 1941.  C. C. KINKER  2,243,756
ACTUATING MECHANISM FOR CUTOFF KNIVES
Original Filed July 1, 1938  4 Sheets-Sheet 3

C. C. Kinker
INVENTOR.
BY Rule & Hoge
ATTORNEYS.

May 27, 1941.  C. C. KINKER  2,243,756
ACTUATING MECHANISM FOR CUTOFF KNIVES
Original Filed July 1, 1938  4 Sheets-Sheet 4

C. C. Kinker
INVENTOR.
BY Rule & Hoge
ATTORNEYS.

Patented May 27, 1941

2,243,756

UNITED STATES PATENT OFFICE 2,243,756

ACTUATING MECHANISM FOR CUTOFF KNIVES

Clarence C. Kinker, Montreal, Quebec, Canada, assignor to Owens-Illinois Glass Company, a corporation of Ohio Continuation of application Serial No. 217,001, July 1, 1938. This application December 30, 1938, Serial No. 248,465

7 Claims. (Cl. 49—5)

The present invention relates to improvements in rotary glassware forming machines of the type in which charges of molten glass are gathered by suction in a series of blank molds from the exposed surface of a pool of molten glass over which the molds travel in succession. The instant application is a continuation of application No. 217,001, filed July 1, 1938.

More specifically, the invention is concerned with the charge severing mechanism or cut-off knives of such machines which travel with the molds and rock across the bottom of the blank molds as the latter lift from the molten glass to sever the strings of glass which depend from the lower ends of the blanks when the latter are gathered into the blank molds.

The principal object of the invention is to provide an actuating mechanism for the cut-off knives whereby the knives are more effectively actuated than heretofore by virtue of their being moved with great rapidity across the bottoms of the blank molds by the potential energy stored in a coil spring, obtained as the molds approach the charging position, and released at the proper time by a cam actuated trigger mechanism.

Another object of the invention is to provide an actuating mechanism of the type set forth above by means of which the cut-off knives are yieldingly moved into engagement with the lower ends of the gathered charges in the blank molds during the shearing operations in such a manner that if an obstruction is met while shearing the actuating mechanism will yield and prevent damage to either the knife, its supporting instrumentalities or to the actuating mechanism itself.

A still further object of the invention is to provide a knife actuating mechanism which, upon actuation of the cut-off knife and after the shear has taken place assumes a locked position and maintains the knife itself locked in its position beneath the blank mold until such time as the knife is returned to its off-side position preparatory to transfer of the formed blank to the finishing mold as is customary in glassware forming machine operations.

Other objects of the invention, not at this time enumerated, will become apparent hereinafter.

The invention is illustrated in connection with a forming machine of the type employing an annular series of blank mold units and an annular series of finishing mold units, each series being mounted for continuous rotation about separate vertical axes. Examples of machines of this type are disclosed in United States patents to O'Neill, Nos. 1,981,244 and 2,148,494, issued November 20, 1934, and Feb. 28, 1939, respectively. By modification however the invention is applicable to other types of forming machines. Since the invention is restricted to improvements in the mechanism by means of which charges of molten glass in the blank molds are severed from the supply body thereof, no illustration of the details of construction of the finishing mold units or their supporting carriage is made herein.

Figure 1:
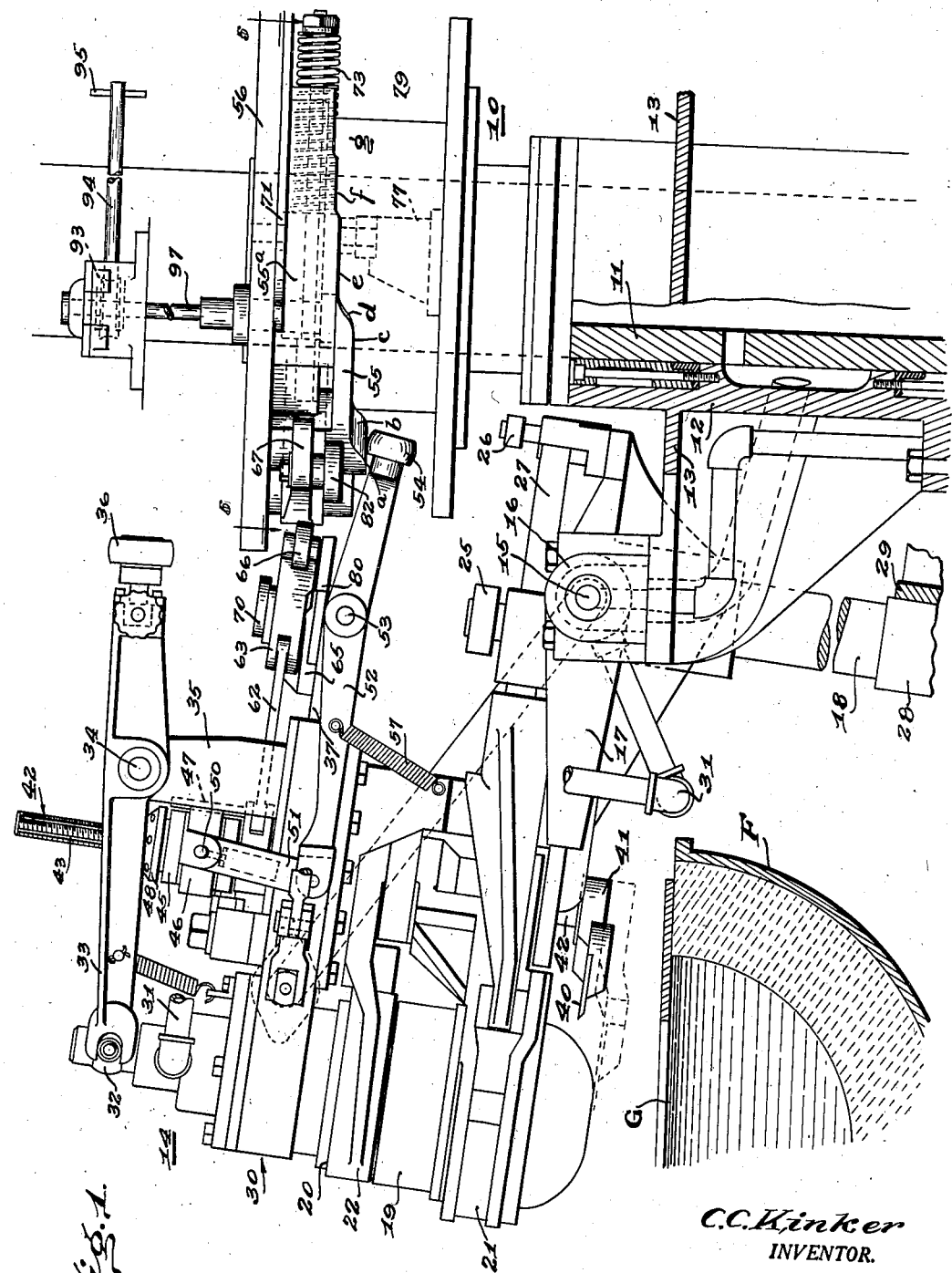
Fig. 1 is a fragmentary detail side elevational view, with parts in section, of a mold group to which the improved knife actuating mechanism has been applied and showing the former operatively associated with a pool of molten glass.

Referring now to Fig. 1, the blank mold carriage 10 is mounted for rotation about the lower portion of a hollow central vertical column 11 and includes a hollow hub 12 and a spider 13 formed integrally with the upper end of the hub and adapted to directly support a series of blank mold units 14.

Each blank mold unit 14 is mounted upon a horizontal hinge pin 15 which is supported in bearings 16 on the spider 13 and includes a head casting 37 secured to a rockable frame 17, the latter being connected at its inner end to a lever 18 by means of which the dipping movements of the blank mold unit 14 with respect to the supply body of molten glass G contained within the forebay F are controlled. The lever extends downwardly from the frame 17 and at its lower end carries a cam roll 28 which rides upon the face of the dip cam 29. Partible body blank and neck molds 19 and 20 respectively are mounted at the outer end of the frame 17, such mounting being effected through body blank mold arms 21 and neck mold arms 22 which are pivoted upon a vertical tubular hinge pin 23 (Fig. 6) mounted in vertically spaced bearings, the uppermost bearing being shown at 24.

A cam roller 25 (Fig. 1) controls the opening and closing of the body blank molds 19 while a cam roller 26 controls the operation of a latch mechanism 27 for holding the body blank mold closed and reference may be had to the later issued patent to O'Neill for example for a full disclosure of the opening and closing mechanism, and the latch mechanism.

A series of combined blowing head and plunger units 30 having air pressure supply pipes 31 leading thereto are operatively disposed above the neck molds 20. Plungers 32 associated therewith are adapted to be moved vertically by means of levers 33 pivoted to horizontal hinge pins 34 mounted in brackets 35 on the head casting 37. Tilting of the levers 33 is effected by means of cam rollers 36 carried at the inner end thereof. The mechanism by means of which the levers 33 are tilted together with the means for connecting the air pipes 31 to a source of air pressure utilized in the usual compression blow and puff are fully illustrated in the above mentioned later issued patent to O'Neill and reference may be had thereto for a full disclosure thereof as well as for a disclosure of many of the less salient features of the blank mold carriage herein illustrated but not described.

The various instrumentalities thus far described are more or less conventional in their design and no claim is made herein to any novelty connected therewith, the novelty of the present invention residing rather in the charge severing means which will now be described.

Figure 2:
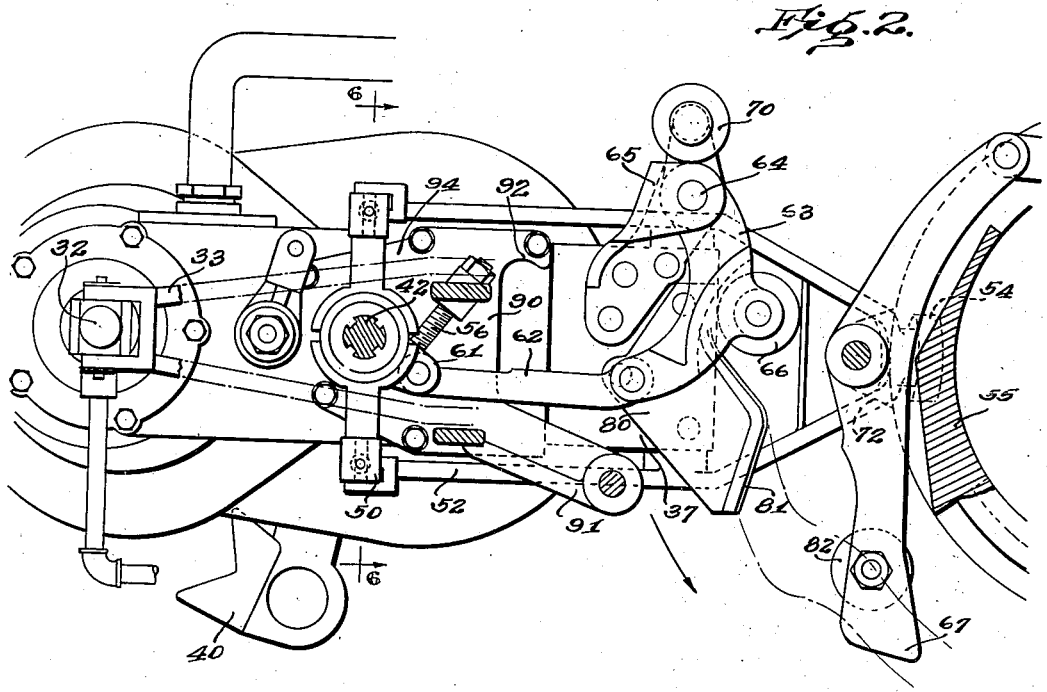
Fig. 2 is a fragmentary top plan view, with parts in section, of the mold group shown in Fig. 1.

The charge severing means by which excess glass is severed from a gathered mold charge in the blank mold includes a cut-off knife 40 (Figs. 1 and 6) attached to the outer end of an arm 41 which in turn is supported at the lower end of a vertical rock shaft 42 extending upwardly through the hollow mold hinge pin 23. The upper portion of the rock shaft 42 is splined as at 43 and is provided with a series of interrupted threads 44 thereon. A flanged sleeve 45 is threaded at its upper end to the shaft 42 and has loosely mounted thereon a collar 46, the latter being held against rotation by means of a key 47 carried by the bracket 35. A lock nut 48 is threaded upon the rock shaft 42 and secures the flanged sleeve 45 in any desired adjusted position. By rotating the sleeve 45 elevation of the rock shaft and consequently of the knife arm or holder 41 may be changed as circumstances require to adjust the elevation of the cut-off knife 40 and thereby compensate for differences in the length of the blank molds employed. The collar 46 is provided with a pair of trunnions 50 (Figs. 1 and 2) to which there are pivoted a pair of depending links 51, the latter having pivotal connection with a pair of levers 52. The levers 52 are pivoted to hinge pins 53 on the casting 37 and have their free ends joined together and at their point of juncture carry a cam roller 54 which periodically engages a cam 55 (see also Figs. 5 and 7) mounted on the underneath side of a cam plate 56, formed on a nonrotatable sleeve 79, the latter being held against rotation on the central column 11.

Figure 4:
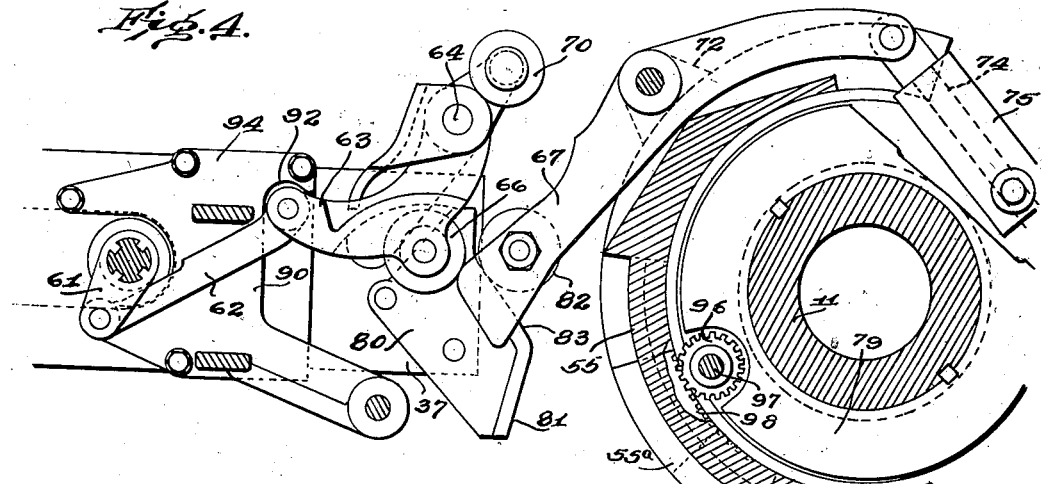
Fig. 4 is a view similar to Fig. 3 with the parts thereof in another position.

The cam 55 is designed with a raised cam surface $a$ onto which the roller 54 rides to raise the cut-off knife 40 to the elevated position shown in full lines in Fig. 1 wherein the knife occupies a position above the bottom of the blank mold during and after the gathering operation. An inclined surface $b$ provided on the cam 55 below which the roller rides after the mold has cleared the glass G causes the knife 40 to become lowered to the dotted line position preparatory to the actual shearing operation. The shearing operation takes place during travel of the roller on a horizontal cam surface $c$. A second inclined surface $d$ compensates for the lowering of the frame 17 to its horizontal position preparatory to the compression blow which takes place while the roller travels on a horizontal cam surface $e$. Thus during the compression blow the relative position between the knife and blank mold is not changed and the knife remains below the blank mold to support the charge thereon during the compression blow in accordance with usual mold practice. The compression blow occurs during travel of the roller on a horizontal cam surface $f$. A third relatively small inclined cam surface $g$ lowers the knife slightly in order that the same may clear the mold and charge preparatory to being swung to its inoperative position away from and to one side of the mold. The portion $55^a$ (Fig. 5) of the cam 55 including the compression blow surface $f$ and the inclined surface $g$ is capable of circumferential adjustment about the axis of the central column 11 to lengthen or shorten the compression blow as may be desired. Toward this end (Figs. 1 and 4) this portion $55^a$ is circumferentially slidable on the other portion of the cam 55 and is provided with internal teeth 98 which remain in constant mesh with a gear 96 carried at the lower end of a vertical shaft 97, the latter being connected through a worm and gear mechanism 93 to an adjusting shaft 94 having manual means 95 whereby the same may be manipulated.

A coil spring 57 (Fig. 1) normally holds the knife in its lowermost position at one side of the blank mold. A set screw 56 determines the angular off-side position of the knife.

Figure 6:
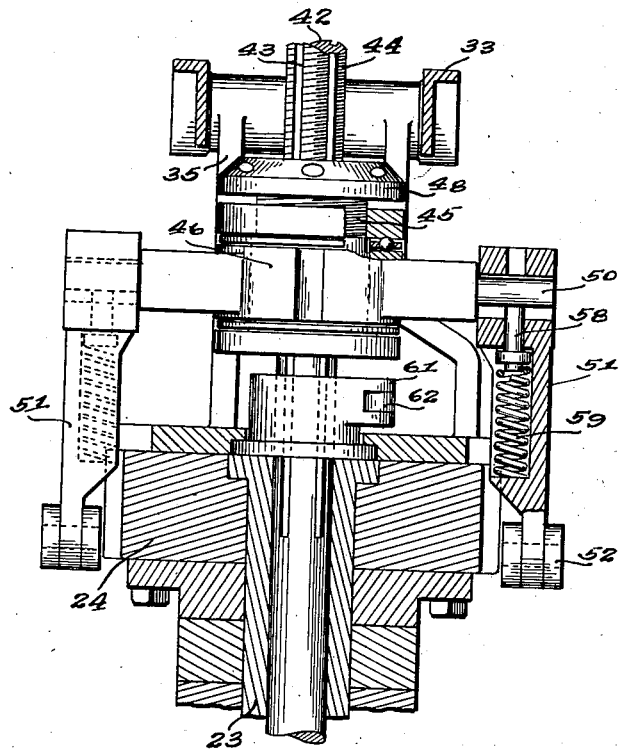
Fig. 6 is a sectional view taken substantially along the line 6—6 of Fig. 2.
Figure 7:
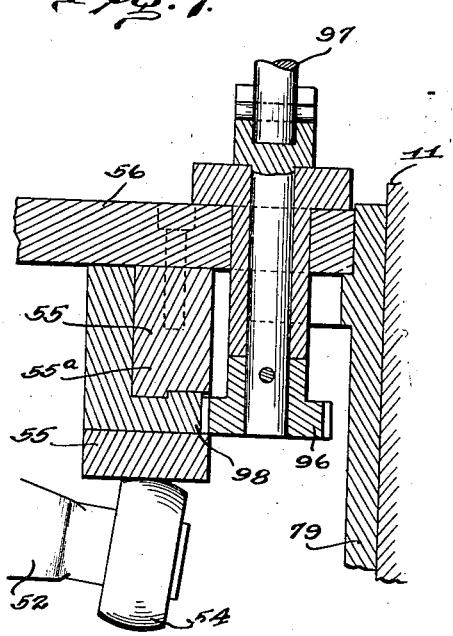
Fig. 7 is a sectional view taken substantially along the line 7—7 of Fig. 5.

Referring now to Fig. 6, the trunnions 50 have effective diameters somewhat less than the diameters of the holes provided in the links 51 into which they extend. Lost motion is taken up by means of pins 58 which bear against the trunnions and which extend through the upper portions of the links 51. Coil springs 59 which are disposed in recesses 60 in the links bear against the pins 58 and hold the same in position. Thus it will be seen that during the shearing operation, when the knife 40 is in contact with the bottom of the blank mold 19, the knife is yieldingly held in such engagement and any relative movement vertically between the knife and mold due to camming engagement between the two is compensated for.

Swinging of the cut-off knife is obtained by mechanism including an arm 61 (Figs. 2, 3, 4 and 5) splined to the rock shaft 42 and connected to a push rod 62 which in turn is connected to one end of a lever 63 or link. The lever 63 is anchored near its other end as at 64 for pivotal movement on a bracket 65 secured to the head casting 37. The lever 63 carries a cam roller 66 medially thereof which roller is designed for engagement with a kicker arm 67 in a manner presently to be described for the purpose of actuating the push rod 62 to swing the knife 40 rapidly beneath the blank mold to effect the shear. A roller 70 positioned at the free end of the lever 63 is designed for engagement with a stationary cam 71 (Figs. 1 and 5) and operates to return the knife to its inoperative position from beneath the blank mold.

Figure 5:
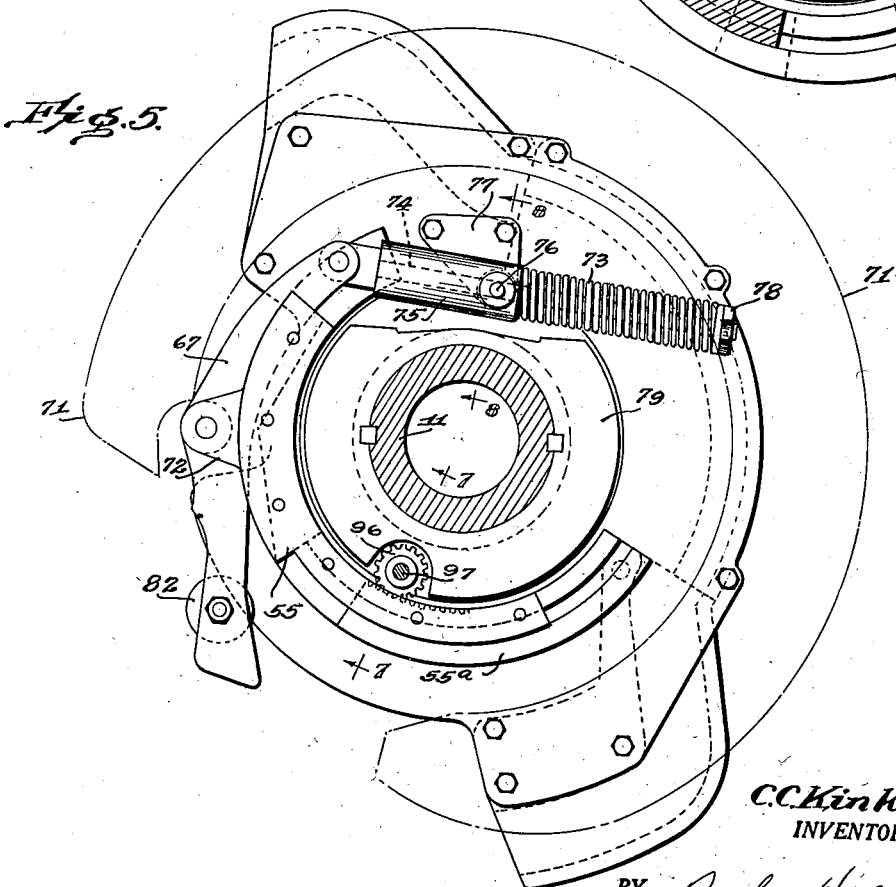
Fig. 5 is a sectional view taken substantially along the line 5—5 of Fig. 1.
Figure 8:
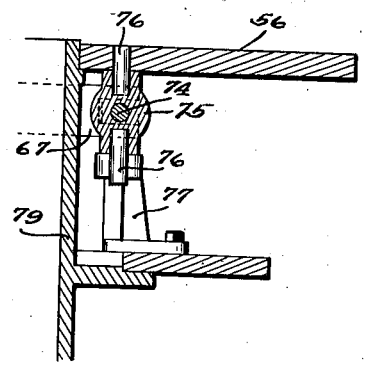
Fig. 8 is a sectional view taken substantially along the line 8—8 of Fig. 5.

The kicker arm 67 is pivoted medially of its ends to a lug 72 (Figs. 2, 3, 4 and 5) formed on the cam 55 and is normally held extended as shown in Fig. 5 by means of a coil spring 73. One end of the kicker arm 67 is pivoted to a rod 74 which passes through a sleeve 75 (also Fig. 8), the latter being pivoted by means of trunnions 76 between the cam plate 56 and a bracket 77 secured to the carriage 10. The coil spring 73 surrounds the rod 74 and bears at one end against the sleeve 75 and at the other end against a collar 78 which is adjustably held on the free end of the rod 74.

Figure 3:
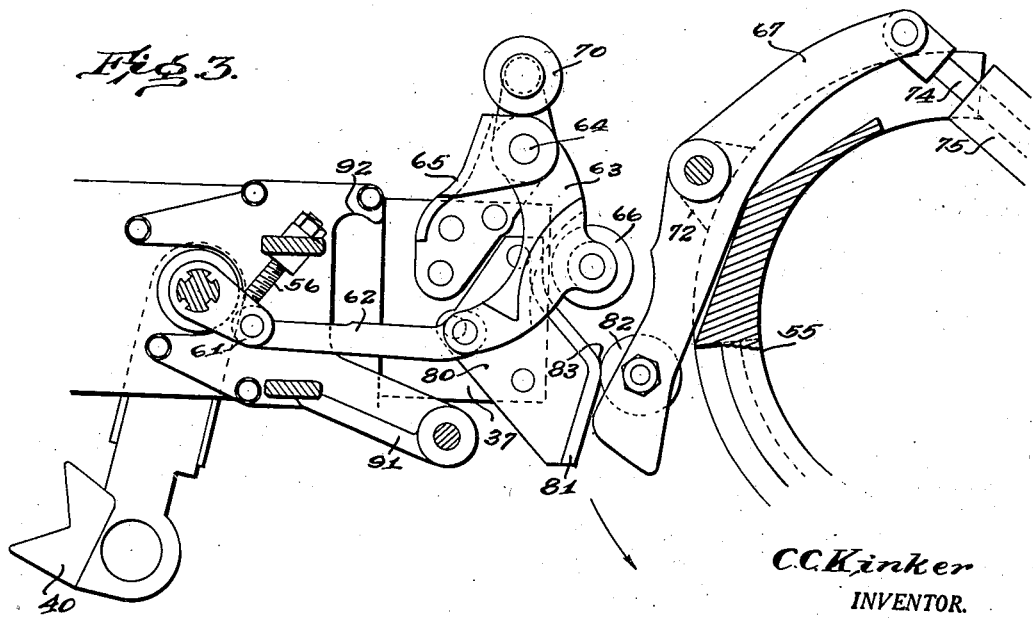
Fig. 3 is a view similar to Fig. 2 with certain parts removed and others in a different position.

A plate 80 secured to the head casting 37 is provided with a cam surface 81 designed for engagement with a roller 82 mounted on the kicker arm 67 near the free end thereof. Toward this end, as the mold carriage 10 rotates in the direction indicated by the arrows in Figs. 2, 3 and 4 and the mold unit 14 becomes inclined from its lower position as shown in Fig. 3, the cam surface 81 on the plate 80 follows the path of the broken lines in Fig. 2 and is moved into contact with the roller 82 which it forces inwardly of the carriage 10 thus rocking the kicker arm 67 and storing energy in the coil spring 73. The plate 80 is provided with an inclined cam surface 83 which is relatively steep with respect to the swinging path of movement of the cam roller 82 and amounts substantially to a complete release of the roller 82 by the plate 80 when the former passes off of the cam surface 81. The kicker arm 67 is thus extended under the influence of the coil spring 73 and engages the roller 66 and swings the lever 63 about its pivotal axis. Such movement of the lever 63 actuates the push rod 62 and rotates the rock shaft 42 carrying the knife holder or arm 41 and swings the knife 40 to sever the mold charge from the supply body G.

A bracket 90 (Fig. 4) secured to the head casting has formed thereon an arm 91 by means of which certain blank mold actuating instrumentalities forming no part of this invention are supported. The bracket 90 is formed with an abutment 92 therein against which the pivotally connected ends of the push rod 62 and lever 63 are adapted to strike to determine the limit of swinging movement of the lever 63 during the severing operation by the cut-off knife 40. The abutment 92 is positioned to one side of the center line passing through the pivot point 64 for the lever 63 and the pivotal connection between the arm 61 and push rod 62 when the parts are in the extreme position shown in Fig. 4. Thus the push rod 62 and lever 63 act in the manner of a toggle joint and assume a locked position after actuation by the kicker arm 67. Locking of the push rod 62 and lever 63 serves to lock the entire actuating instrumentalities for the cutoff knife 40 as well as to lock the knife itself beneath the blank mold and maintain the same locked until such time as the roller 70 engages the stationary cam 71 whereupon the toggle joint is broken and the knife is restored to its off-side position.

It is particularly to be noted that during the actual severing operation, from the commencement until the completion thereof, the roller 82 and arm 67 are in contact so that if an obstruction is encountered by the cut-off knife 40 the shock imparted to the knife will be transmitted through the whole train of actuating mechanism including the shaft 42, arm 61, push rod 62, lever 63, roller 66, kicker arm 67, and rod 74 and will be assimilated by the coil spring 73. Thus breakage of the knife or any part of its actuating mechanism will be prevented.

Modifications may be resorted to within the spirit and scope of this invention.

I claim:

1. In a glassware forming machine including a stationary central column, a mold carriage rotatively mounted upon the column, an annular series of mold groups on said carriage, each group including a suction type blank mold, a swingable cut-off knife for each mold and vertical rock shafts individual to the knives journaled in the mold carriage and connected at their lower ends to the knives; the improvement which consists in mechanism for actuating the knives, said mechanism comprising an arm common to the mold groups pivoted medially to the column and movable in a horizontal plane, a spring connected to one end of the arm and normally maintaining the other end spaced radially outward from the column, devices carried by each mold group including means for rocking the arm and thereby momentarily energizing the spring and means permitting deenergization of the spring, a radial push rod connected at its outer end to the rock shaft and a lever pivoted to the inner end of the push rod and positioned for engagement with and actuation by said other end of the arm during de-energizing of the spring whereby to operate the knife.

2. In a glassware forming machine including a stationary central column, a mold carriage rotatively mounted upon the column, an annular series of mold groups on said carriage, each group including a suction type blank mold, a swingable cut-off knife for each mold and vertical rock shafts individual to the knives journaled in the mold carriage and connected at their lower ends to the knives; the improvement which consists in mechanism for actuating the knives, said mechanism comprising an arm common to the mold groups pivoted medially to the column and movable in a horizontal plane, a spring connected to one end of the arm and normally maintaining the other end spaced radially outward from the column, devices carried by each mold group including means for rocking the arm and thereby momentarily energizing the spring and means permitting deenergization of the spring, a radial push rod connected at its outer end to the rock shaft, a lever pivoted to the inner end of the push rod and positioned for engagement with and actuation by said other end of the arm during de-energizing of the spring whereby to operate the knife, and means for releasably locking the lever in the position to which it is moved by engagement with the arm.

3. In a glassware forming machine including a stationary central column, a mold carriage rotatively mounted upon the column, an annular series of mold groups on said carriage, each group including a suction type blank mold, a swingable cut-off knife for each mold and vertical rock shafts individual to the knives journaled in the mold carriage and connected at their lower ends to the knives; the improvement which consists in mechanism for actuating the knives, said mechanism comprising an arm common to the mold groups pivoted medially to the column and movable in a horizontal plane, a spring connected to one end of the arm and normally maintaining the other end spaced radially outward from the column, devices carried by each mold group including means for rocking the arm and thereby momentarily energizing the spring and means permitting deenergization of the spring, a radial push rod connected at its outer end to the rock shaft, a lever pivoted to the inner end of the push rod and positioned for engagement with and actuation by said other end of the arm during de-energizing of the spring whereby to operate the knife, means for releasably locking the lever in the position to which it is moved by engagement with the arm, means for returning said lever and push rod to its initial position including an extension at one end of the lever, a cam roller carried by the extension, and a stationary cam for engaging the roller and moving said lever and rod.

4. In a glassware forming machine including a stationary central column, a mold carriage rotatively mounted upon the column, an annular series of mold groups on said carriage, each group including a suction type blank mold, a swingable cut-off knife for each mold and vertical rock shafts individual to the knives journaled in the mold carriage and connected at their lower ends to the knives; the improvement which consists in mechanism for actuating the knives, said mechanism comprising an arm common to the mold groups pivoted medially to the column and movable in a horizontal plane, a spring connected to one end of the arm and normally maintaining the other end spaced radially outward from the column, devices carried by each mold group including means for rocking the arm and thereby momentarily energizing the spring and means permitting deenergization of the spring, a radial push rod connected at its outer end to the rock shaft, a lever pivoted at one end to the inner end of the push rod and at its other end to a frame for the corresponding mold group, and a cam roller carried by said lever and positioned for engagement with and movement by the extended end of the arm during deenergization of the spring whereby to operate the cut-off knife.

5. In a glassware forming machine including a stationary central column, a mold carriage rotatively mounted upon the column, an annular series of mold groups on said carriage, each group including a suction type blank mold, a swingable cut-off knife for each mold and vertical rock shafts individual to the knives journaled in the mold carriage and connected at their lower ends to the knives; the improvement which consists in mechanism for actuating the knives, said mechanism comprising an arm common to the mold groups pivoted medially to the column and movable in a horizontal plane, a spring connected to one end of the arm and normally maintaining the other end spaced radially outward from the column, devices carried by each mold group including means for rocking the arm and thereby momentarily energizing the spring and means permitting deenergization of the spring, a radial push rod connected at its outer end to the rock shaft, a lever pivoted at one end to the inner end of the push rod and at its other end to a frame for the corresponding mold group, a cam roller carried by said lever and positioned for engagement with and movement by the extended end of the arm during deenergization of the spring whereby to operate the cut-off knife, and means for releasably locking the lever and push rod in the position to which they are moved by engagement with said arm.

6. In a glassware forming machine including a stationary central column, a mold carriage rotatively mounted upon the column, an annular series of mold groups on said carriage, each group including a suction type blank mold, a swingable cut-off knife for each mold and vertical rock shafts individual to the knives journaled in the mold carriage and connected at their lower ends to the knives; the improvement which consists in mechanism for actuating the knives, said mechanism comprising an arm common to the mold groups pivoted medially to the column and movable in a horizontal plane, a spring connected to one end of the arm and normally maintaining the other end spaced radially outward from the column, devices carried by each mold group including a cam engageable with the extended end of the arm for rocking the latter and thereby momentarily energizing the spring and means permitting deenergization of the spring, a radial push rod connected at its outer end to the rock shaft and a lever pivoted to the inner end of the push rod and positioned for engagement with and actuation by said other end of the arm during de-energizing of the spring whereby to operate the knife.

7. In a glassware forming machine comprising a stationary part and a rotary part, cut-off mechanism comprising energy storing means mounted on the stationary part of the machine and movable means connected thereto and projecting into the path of movement of the rotary part of the machine, vertical rock shafts, each having a knife fixed thereto, mounted on the rotary part of the machine, a crank fixed to each rock shaft, a lever pivoted to the rotary part of the machine, a push rod connecting the lever and crank, an abutment on the rotary part of the machine for limiting the swinging movement of the lever, and means on the rotary part of the machine to engage said movable means and move it in one direction to store energy in said energy storing means and then to release said movable means during rotation of said rotary part so that the movable means is swung by the energy storing means against the lever and moves the lever until it engages the abutment, said movement actuating the knife by turning the rock shaft.

CLARENCE C. KINKER.